United States Patent

Lin

(10) Patent No.: US 8,441,578 B2
(45) Date of Patent: May 14, 2013

(54) SLICER LEVEL CALCULATOR

(75) Inventor: Hsin-I Lin, Yilan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 13/424,934

(22) Filed: Mar. 20, 2012

(65) Prior Publication Data

US 2012/0242899 A1    Sep. 27, 2012

(30) Foreign Application Priority Data

Mar. 22, 2011 (TW) .............................. 100109772 A

(51) Int. Cl.
*H04N 5/08* (2006.01)

(52) U.S. Cl.
USPC ........................................................ 348/534

(58) Field of Classification Search .................. 348/534, 348/465, 461, 553, 725; 375/340, 316; 327/50
See application file for complete search history.

(56) References Cited

U.S. PATENT DOCUMENTS

| | | | |
|---|---|---|---|
| 3,204,029 A * | 8/1965 | Groff et al. | 375/270 |
| 7,119,317 B2 * | 10/2006 | Ando et al. | 250/208.1 |
| 7,932,958 B2 * | 4/2011 | Yun et al. | 348/725 |
| 2006/0203127 A1 * | 9/2006 | Choi et al. | 348/614 |
| 2011/0013083 A1 * | 1/2011 | Lu | 348/468 |

* cited by examiner

*Primary Examiner* — Paulos M Natnael
*(74) Attorney, Agent, or Firm* — Rabin & Berdo, P.C.

(57) ABSTRACT

A slicer level calculator including a signal detector, a moving average calculator, a sync-tip voltage sample circuit, a blanking voltage sample circuit, a slicer level calculator, and a rear-end processor is disclosed. The signal detector determines whether an input video signal satisfies a low signal to noise ratio (SNR) criterion. If so, the first signal detector further enables a low SNR control signal. The moving average calculator obtains a moving average voltage level of the input video signal. The sync-tip voltage sample circuit, the blanking voltage sample circuit and the slicer level calculator obtain a sync-tip voltage level, a blanking voltage level, and a slicer voltage level, respectively. The rear-end processor selectively executes low-pass filtering operation on the slicer voltage level in response to the low SNR control signal.

14 Claims, 5 Drawing Sheets

SLICER LEVEL CALCULATOR

This application claims the benefit of Taiwan application Serial No. 100109772, filed Mar. 22, 2011, the subject matter of which is incorporated herein by reference.

BACKGROUND OF THE INVENTION

1. Field of the Invention

The invention relates in general to a slicer level calculator, and more particularly to a slicer level calculator adaptable to the signal to noise ratio (SNR) criterion and the co-channel interference criterion of an input video signal for changing the operation of computing the slicer level.

2. Description of the Related Art

The technology for restoring the obtained sync signal according to received image signal already exists. When the sync signal is a binary signal, the image signal has two different signal levels (high level and low level) in response to different logic values (logic value 1 and logic value 0). In the present example, the operation of restoring the sync signal from the image signal needs to correspondingly determine which component of the image signal corresponds to logic value 1 and which component of the image signal corresponds to logic value 0. In general, the operation for determining the logic value of the image signal is implemented by comparing the level of the image signal with the slicer level, such as the middle value between the blanking voltage level and the sync-tip voltage level of the image signal.

However, in practical application, the estimated slicer level often has low accuracy when the image signal has a low signal to noise ratio (SNR) or is under the influence of co-channel interference. As a result, the sync timing is too long and the error rate of the obtained sync signal is too high.

SUMMARY OF THE INVENTION

The invention is directed to a slicer level calculator. In comparison to the conventional slicer level calculation circuit, the slicer level calculator of the invention is advantaged by being capable of effectively generating the slicer level with higher accuracy when the image signal has a low signal to noise ratio (SNR) or is under the influence of co-channel interference.

The present invention discloses a slicer level calculator used for obtaining a slicer level of an input video signal. The slicer level calculator includes a first signal detector, a moving average calculator, a sync-tip voltage sample circuit, a blanking voltage sample circuit, a slicer level calculator and a rear-end processor. The first signal detector determines whether an input video signal satisfies a low signal to noise ratio (SNR) criterion. If so, the first signal detector further enables the low SNR control signal. The moving average calculator obtains a moving average voltage level of the input video signal. The sync-tip voltage sample circuit obtains the sync-tip time information and the sync-tip voltage level of the input video signal. The blanking voltage sample circuit obtains blanking time information and the blanking voltage level of the input video signal with reference to the sync-tip time information. The slicer level calculator obtains the slicer level according to the sync-tip voltage level and the blanking voltage level. The rear-end processor selectively executes low-pass filtering operation on the slicer voltage level in response to the low SNR control signal.

The above and other aspects of the invention will become better understood with regard to the following detailed description of the preferred but non-limiting embodiment(s). The following description is made with reference to the accompanying drawings.

DETAILED DESCRIPTION OF THE INVENTION

The slicer level calculator of the present embodiment of the invention isolates the correspondingly generated voltage redistribution effect and coupling effect and partial circuits of the operation amplifier when the enable switch switches its ON/OFF state.

First Embodiment

The slicer level calculator of the present embodiment of the invention is used in a signal detector related to signal to noise ratio (SNR) for adaptively calculating the slicer level with different computing operations when the input video signal corresponds to different SNR ratios.

Figure 1:
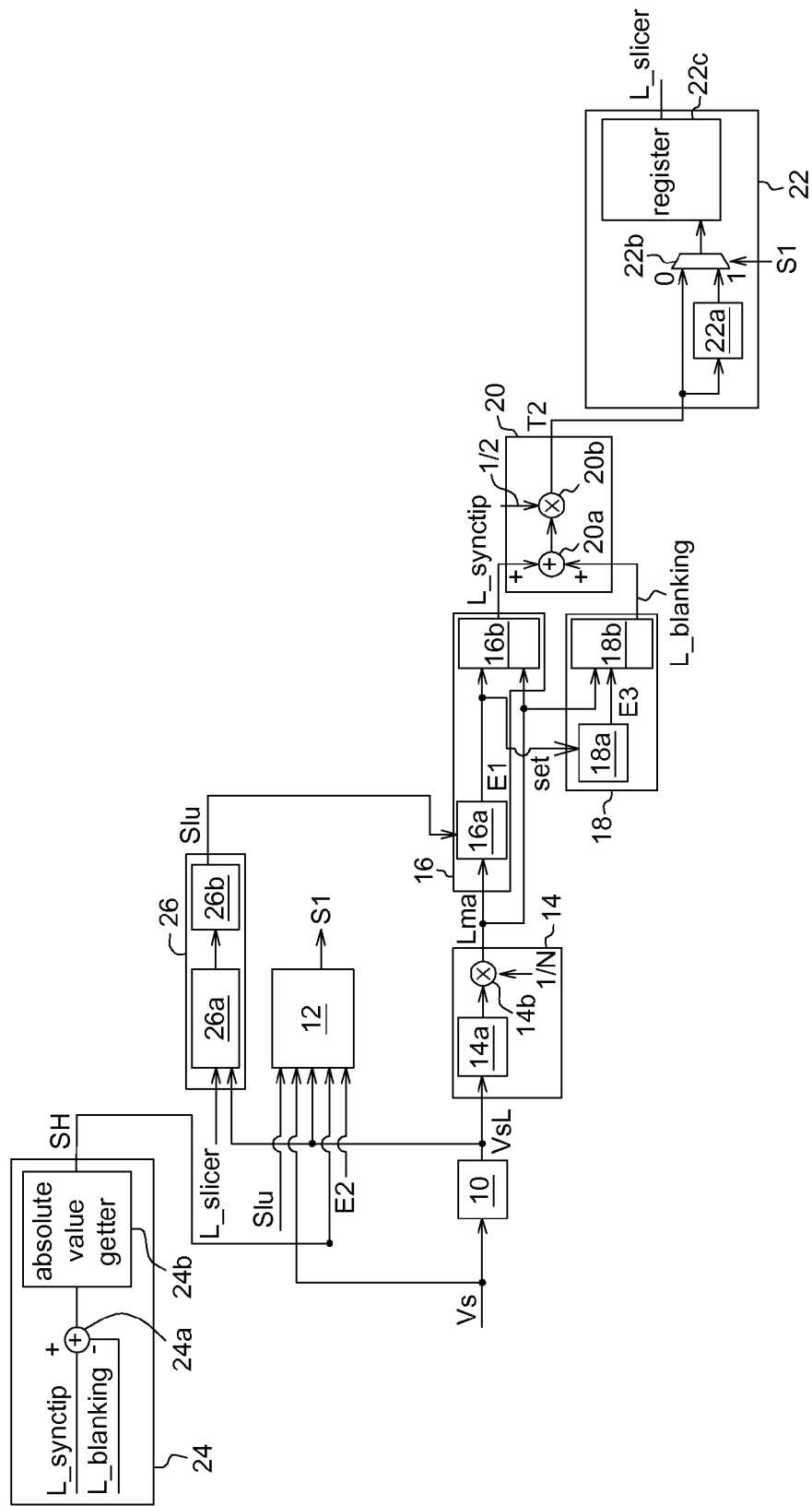
FIG. 1 shows a block diagram of a slicer level calculator according to a first embodiment of the invention.

Referring to FIG. 1, a block diagram of a slicer level calculator according to a first embodiment of the invention is shown. The slicer level calculator 1 receives an input video signal Vs to obtain a slicer level Lsl. The slicer level calculator 1 includes a low-pass filter 10, a signal detector 12, a moving average calculator 14, a sync-tip voltage sample circuit 16, a blanking voltage sample circuit 18, a slicer level calculation circuit 20, a rear-end processor 22 and a timing control circuit 26. The low-pass filter 10 generates a low-pass filtered input video signal VsL according to the input video signal Vs.

The timing control circuit 26 includes a horizontal phase lock loop (HPLL) unit 26a and a timing unit 26b for generating a row updating signal Slu with reference to the low-pass filtered input video signal VsL and the slicer level L_slicer.

Figure 2:
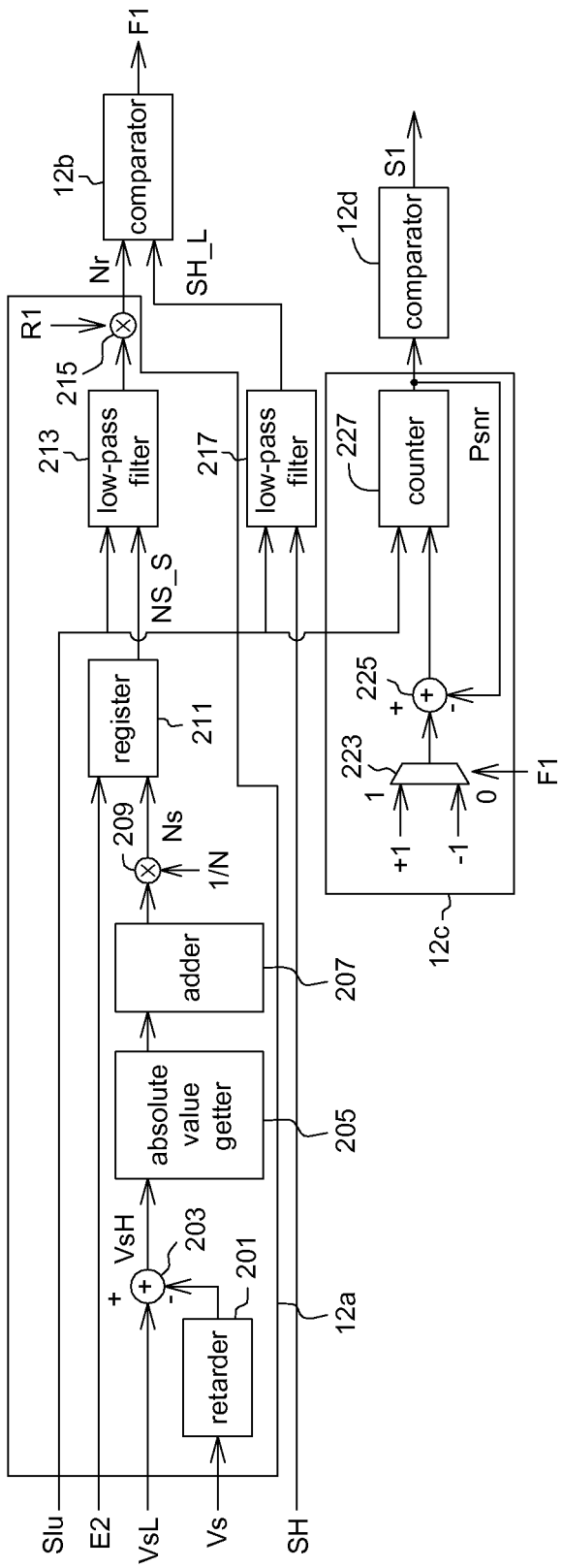
FIG. 2 shows a detailed block diagram of the signal detector 12 of FIG. 1.

The signal detector 12 determines whether the low-pass filtered input video signal VsL satisfies the low signal to noise ratio (SNR) criterion. When the low-pass filtered input video signal VsL satisfies the low SNR criterion, the signal detector 12 enables the low SNR control signal S1. For example, the signal detector 12 includes an operation unit 12a, comparators 12b and 12d and a counting unit 12c as indicated in FIG. 2.

The operation unit 12a obtains a high-frequency component signal VsH of the input video signal Vs according to the input video signal Vs and the low-frequency component signal VsL, and executes absolute values moving average computing and weighting operation on the high-frequency component signal VsH to obtain a noise intensity signal Nr. For example, the operation unit 12a includes a retarder 201, an adder 203, an absolute value getter 205, a summer 207, a multiplier 209 and a register 211.

The retarder 201 and the adder 203 obtains high-frequency component signal VsH according to the difference between the input video signal Vs and the low-frequency component signal VsL. The absolute value getter 205, the summer 207 and the multiplier 209 execute moving average computing operation on absolute values according to the high-frequency component signal VsH to obtain a noise intensity signal NS. The register 211 samples the noise intensity signal NS to obtain a sample signal NS_S in response to the enable serial number E2. The low-pass filter 213 and the multiplier 215 execute weighting operation according to the sample signal NS_S to generate the noise intensity signal Nr.

The comparator 12b determines whether the noise intensity signal Nr is larger than the low-pass filtered sync height signal SH_L generated by the low-pass filter 217. If so, the comparator 12b provides a selection signal F1 corresponding to the first level (such as the selection signal F1 corresponding to logic value 1); otherwise, the comparator 12b provides a selection signal F1 corresponding to the second level (such as the selection signal F1 corresponding to logic value 0).

For example, the sync height signal SH is generated by the sync height signal calculator 24 of the slicer level calculator 1. The sync height signal calculator 24 includes an adder 24a and an absolute value getter 24b for generating the sync height signal SH according to the absolute value of the difference between the sync-tip voltage level L_synctip and the blanking voltage level L_blanking.

The counting unit 12c is progressively increased by 1 in response to a first level determination parameter Psnr of the selection signal F1, and is progressively decreased by 1 in response to a second level determination parameter Psnr of the selection signal F1. For example, the counting unit 12c includes a multiplexer 223, an adder 225 and a counter 227. The multiplexer 223 and the adder 225 selectively provides +1 and −1 in response to the level of the selection signal F1, and executes summing operation on the values provided by the parameter Psnr and the multiplexer 223.

Figure 3:
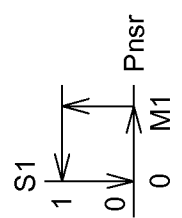
FIG. 3 shows an operation diagram of the comparator 12d of FIG. 2.

The comparator 12d determines whether the parameter Psnr is larger than a threshold M1. When the value of the determination parameter Psnr is larger than the threshold M1, the comparator 12d determines that the input video signal Vs satisfies the low SNR criterion, and correspondingly triggers the enabled low SNR control signal S1, wherein M is la natural number larger than 1. For example, the comparator 12d, realized by such as a hysteresis comparator, outputs the low SNR control signal S1 corresponding to the enable level (such as logic value 1) only when the determination parameter Psnr is larger than the threshold M1 (that is, when it is determined that the input video signal Vs satisfies the low SNR criterion), and outputs the low SNR control signal S1 corresponding to the disable level (such as logic value 0) only when the determination parameter Psnr is smaller than the threshold 0 (that is, when it is determined that the input video signal Vs does not satisfy the low SNR criterion) as indicated in FIG. 3. The threshold M1 is larger than 0.

The moving average calculator 14 obtains a moving average voltage level Lma of the low-pass filtered input video signal VsL. For example, the moving average calculator 14 includes a summer 14a and a multiplier 14b, wherein the summer 14a such as calculates the sum of the low-pass filtered input video signal VsL over N sub-periods of an operation period according to the following formula:

$$Lma = \sum_{i=1}^{N} VsL(i)$$

Wherein, i is a time index, and N is a natural number larger than 1. The multiplier 14b divides the sum obtained by the summer 14a through summation by N to correspondingly obtain an average voltage level Lma of the input video signal VsL over the current segment of operation period.

The sync-tip voltage sample circuit 16 obtains the sync-tip time information T_synctip and the sync-tip voltage level L_synctip of the input video signal Vs during the segment of operation period. For example, the sync-tip voltage sample circuit 16 includes a minimum searching unit 16a and a register 16b. The minimum searching unit 16a enables a middle signal E1 when the minimum of the moving average voltage level Lma over the current segment of operation period is obtained. The register 16b samples the moving average voltage level Lma to obtain the sync-tip voltage level L_synctip in response to the enabled middle signal E1. The minimum searching unit 16a further executes searching operation on the image data of the next row to obtain the sync tip voltage level L_synctip in response to the replacement of the enabled row updating signal Slu.

The blanking voltage sample circuit 18 obtains a blanking time information T_blanking and the blanking voltage level L_blanking of the input video signal Vs with reference to the sync-tip time information T_synctip during the current segment of operation period. For example, the blanking voltage sample circuit 18 includes a down-counter 18a and a register 18b. The down-counter 18a starts to count down after receiving the enabled driving signal E1, so that the enabling of the driving signal E3 is delayed by a delay time (the counting down operation time) after the enabled driving signal E1 is received. The register 18b samples the moving average voltage level Lma to obtain the blanking voltage level L_blanking in response to the enabled driving signal E3.

The slicer level calculator 20 obtains the slicer level T2 according to the sync-tip voltage level L_synctip and the blanking voltage level L_blanking. For example, the slicer level calculator 20 includes an operation unit, which includes an adder 20a and a multiplier 20b, and obtains the slicer level T2 according to the middle value between the blanking voltage level L_blanking and the sync-tip voltage level L_synctip of the image signal.

The rear-end processor 22 selectively executes low-pass filtering operation on the slicer level T2 in response to the low SNR control signal S1, and selectively outputs the slicer level T2 and the low-pass filtered slicer level as slicer levels L_slicer. For example, when the low SNR control signal S1 corresponds to logic value 1 (that is, when it is determined that an input video signal Vs satisfies the low SNR criterion), the rear-end processor 22 correspondingly outputs the low-pass filtered slicer level as a slicer level L_slicer. When the low SNR control signal S1 corresponds to logic value 0 (that is, when it is determined that an input video signal Vs does not satisfy the low SNR criterion), the rear-end processor 22 correspondingly outputs the slicer level T2 as a slicer level L_slicer. For example, the rear-end processor 22 can be realized by such as a low-pass filter 22a, a multiplexer 22b and a register 22c.

The slicer level calculator 1 of the present embodiment of the invention selectively outputs the low-pass filtered slicer level or the not low-pass filtered slicer level according to whether the input video signal Vs satisfies the low SNR criterion.

Second Embodiment

The slicer level calculator of the present embodiment of the invention is used in signal detector related to co-channel interference for adaptively calculating the slicer level with different computing operations when the input video signal corresponds to different intensities of co-channel interference.

Figure 4:
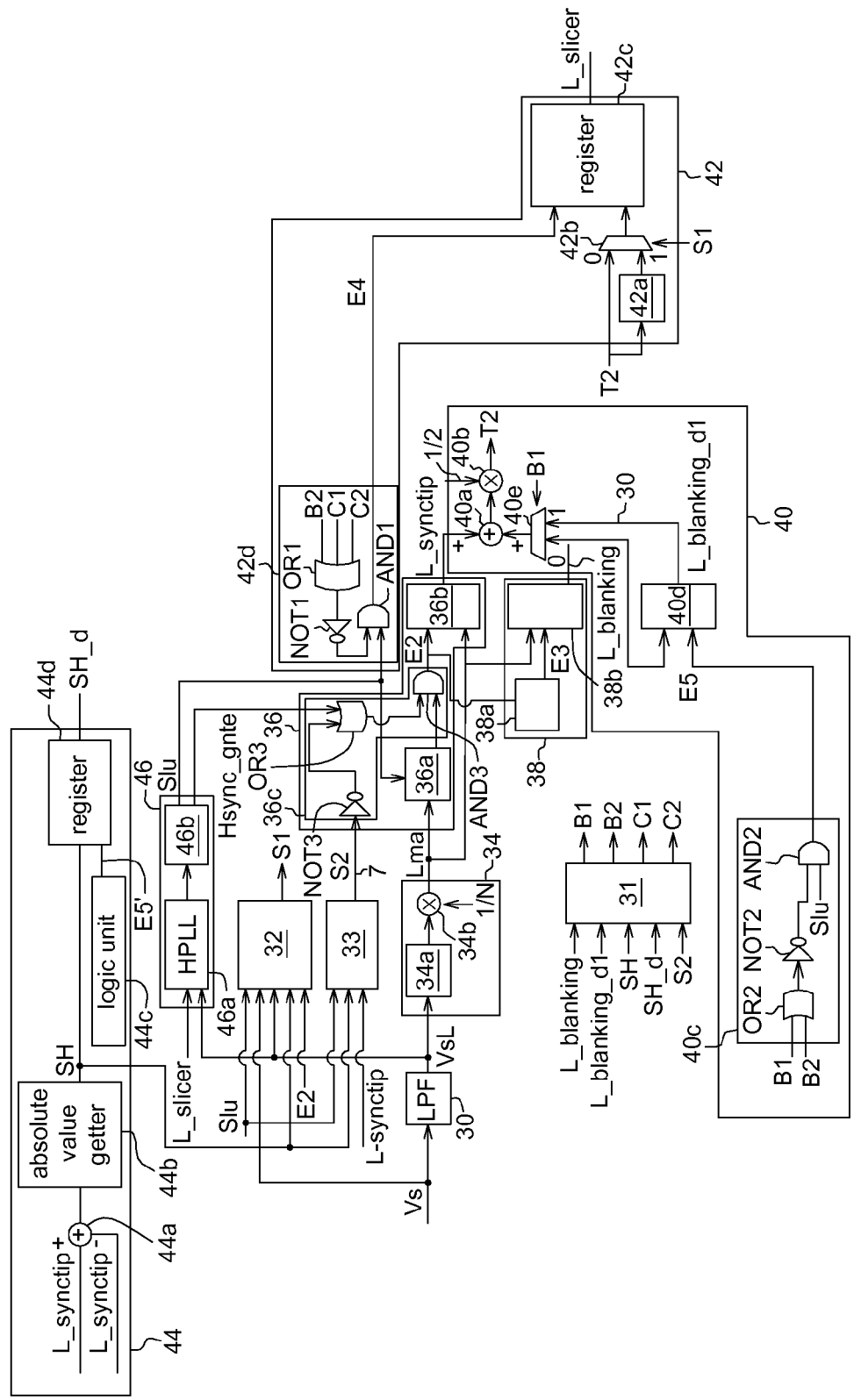
FIG. 4 shows a block diagram of a slicer level calculator according to a second embodiment of the invention.

Referring to FIG. 4, a block diagram of a slicer level calculator according to a second embodiment of the invention is shown. The slicer level calculator 3 of the present embodiment of the invention is different from the slicer level calculator of the first embodiment in that the slicer level calculator 3 further includes a signal detector 33 for detecting the co-channel interference of the input video signal Vs, and a control circuit 31 controlled by the signal detector 33.

The signal detector 33 determines whether an input video signal Vs satisfies the co-channel interference criterion, and enables the co-channel interference control signal S2 to drive the slicer level calculator 3 to calculate the slicer level with different computing operations when the input video signal Vs satisfies the co-channel interference criterion.

Figure 5:
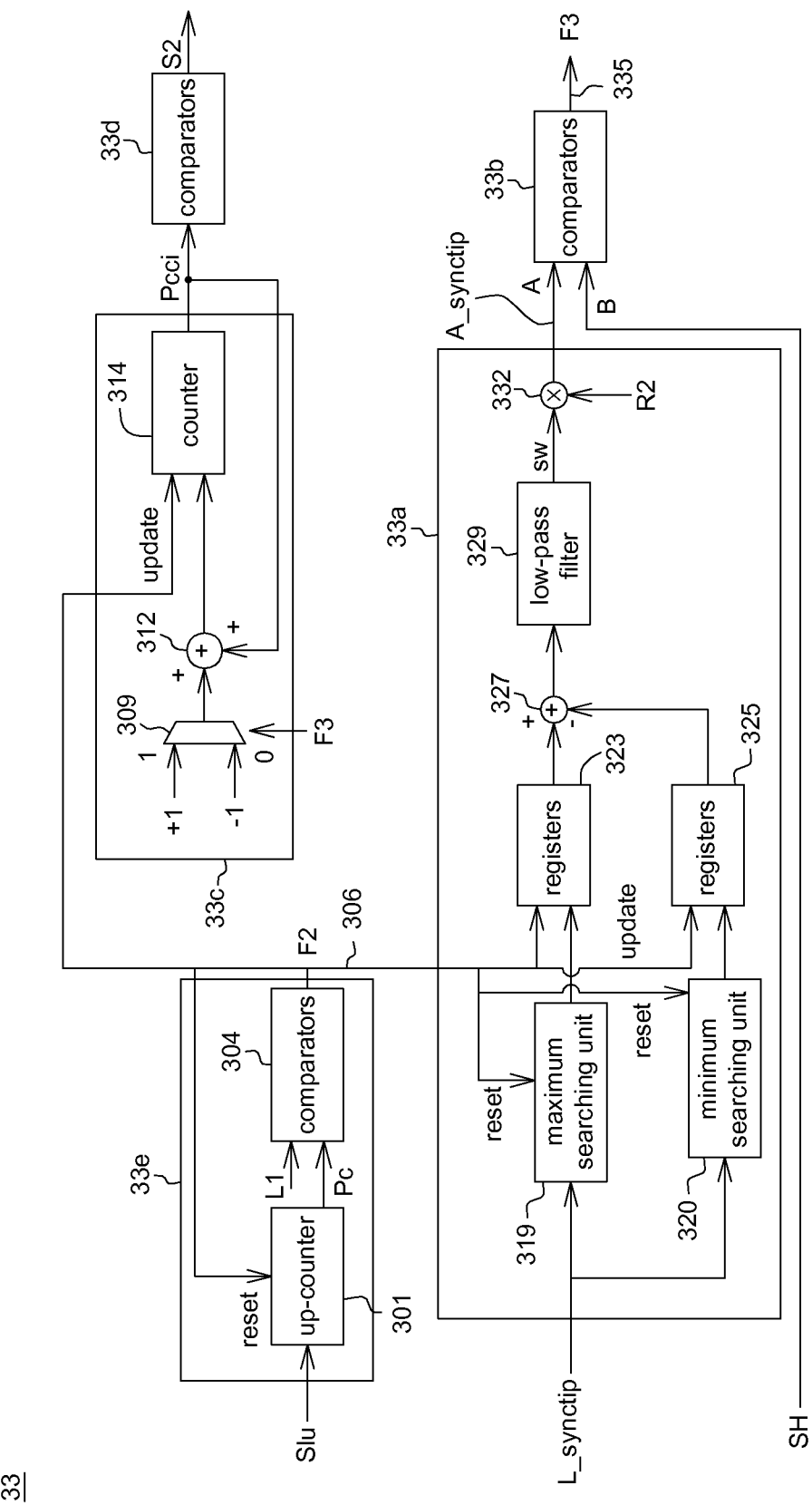
FIG. 5 shows a detailed block diagram of the signal detector 33 of FIG. 4.

Referring to FIG. 5, a detailed block diagram of the signal detector 33 of FIG. 4 is shown. Furthermore, the signal detector 33 includes an operation unit 33a, comparators 33b and 33d, a counting unit 33c and a timing control unit 33e. The operation unit 33a obtains a horizontal sync amplitude A_synctip of the sync-tip voltage level L_synctip. For example, the operation unit 33a includes a minimum searching unit 320, a maximum searching unit 319, registers 323 and 325, an adder 327, a low-pass filter 329 and an multiplier 332 for obtaining the magnitude of the amplitude of the sync-tip voltage level L_synctip with reference to the difference between the maximum and the minimum of the sync-tip voltage level L_synctip, and generating the horizontal sync amplitude A_synctip according to the weighted amplitude.

The comparator 33b determines whether the horizontal sync amplitude A_synctip is larger than the sync height signal SH. If so, this implies that the input video signal Vi has severe co-channel interference, and the comparator 33b correspondingly provides a selection signal F3 corresponding to the first level (such as the selection signal F1 corresponding to logic value 1); otherwise, this implies that the input video signal Vi has minor co-channel interference, and the comparator 33b correspondingly provides a selection signal F3 corresponding to the second level (such as the selection signal F3 corresponding to logic value 0).

The counting unit 33c progressively increases the first level determination parameter Pcci by 1 in response to the selection signal F3, and progressively decreases the second level determination parameter Pcci by 1 in response to of the selection signal F3. For example, the counting unit 33c of the present embodiment and the counting unit 12c of the signal detector 12 of the first embodiment have similar circuit structures and operations, and the similarities are not repeated here.

The comparator 33d determines that the input video signal Vi satisfies the co-channel interference criterion when the value of the determination parameter Pcci is larger than a threshold M2, and correspondingly triggers the co-channel interference control signal S2. Like the comparator 12d disclosed in the signal detector 12 of the first embodiment, the comparator 33d of the signal detector 33, which can also be realized by a hysteresis comparator, outputs the co-channel interference control signal S2 corresponding to the enable level (such as logic value 1) only when the determination parameter Pcci is larger than threshold M2 (that is, when it is determined that an input video signal Vs satisfies the co-channel interference criterion), and outputs the co-channel interference control signal S2 corresponding to the disable level (such as logic value 0) only when the determination parameter Pcci is smaller than the threshold 0 (that is, when it is determined that an input video signal Vs does not satisfy the co-channel interference criterion). The threshold M2 is larger than the value 0.

The timing control unit 33e provides an update timing signal F2 with reference to the row updating signal Slu to control the signal detector 33 to replace the horizontal sync amplitude A_synctip and the determination parameter Pcci every other segment of an update period. The segment of an update period is such as L1 segments of a row updating period, wherein L1 is a natural number. In other words, the update timing signal F2 is enabled every L1 rows of a row updating period to replace the horizontal sync amplitude A_synctip and the determination parameter Pcci. For example, the timing control unit 33e includes an up-counter 301 and a comparator 304 respectively used for progressively increasing the count parameter Pc by 1 and determining whether the count parameter Pc is substantially equal to the value L1 in response to row updating signal Slu. When the count parameter Pc is equal to the value L1, the comparator 304 enables the update timing signal F2 to drive corresponding sub-units of the operation unit 33a to replace the maximum, the minimum, the determination parameter Pcci and the count parameter Pc of the sync-tip voltage level L_synctip.

Figure 6:
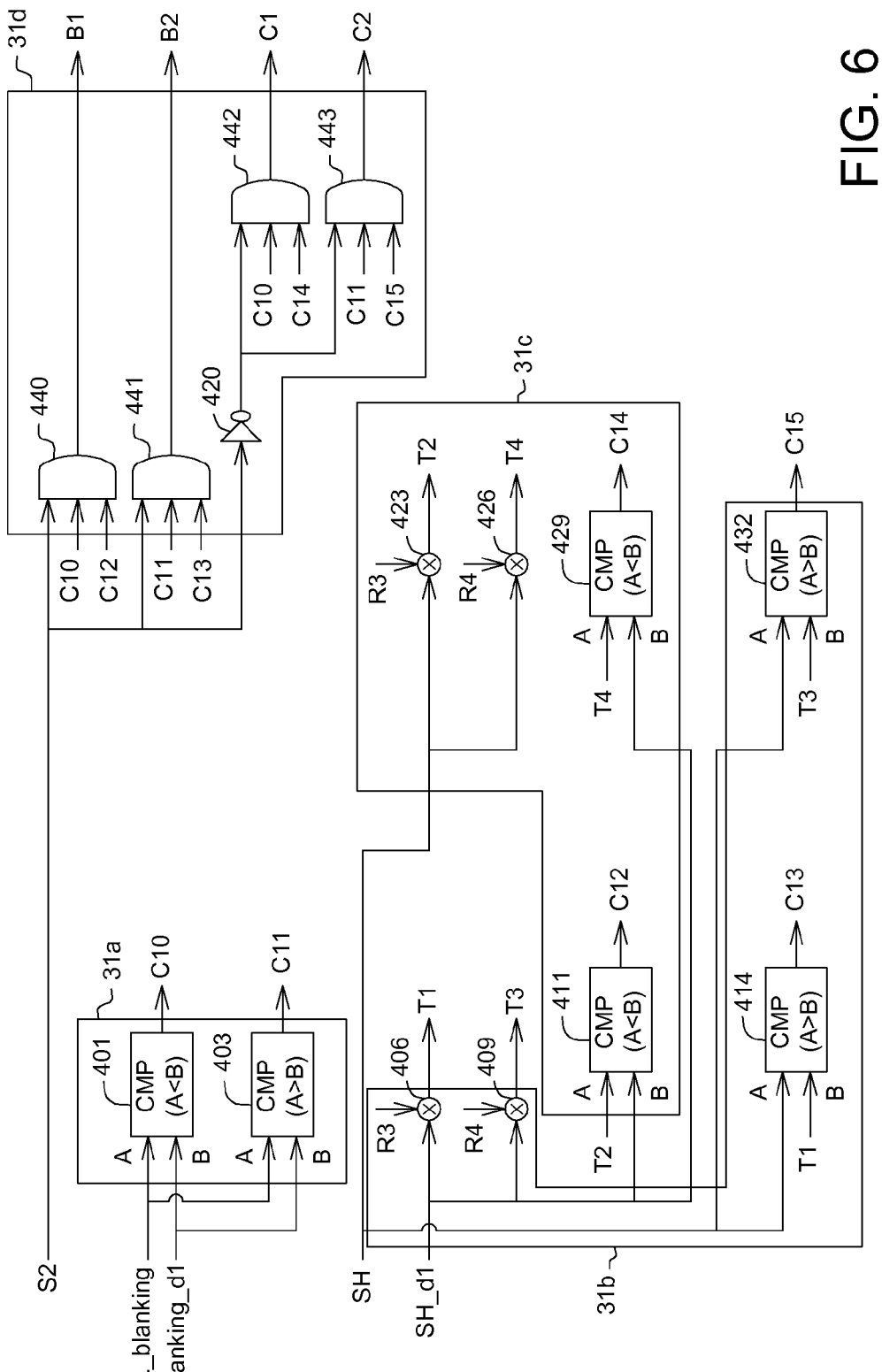
FIG. 6 shows a detailed block diagram of the control circuit 31 of FIG. 4.

The control circuit 31 generates a group of state signals according to the numerical relationship among the co-channel interference control signal S2, the blanking voltage level L_blanking, the previous blanking voltage level L_blanking_d1, the sync height signal SH and the previous sync height signal SH_d1. For example, the group of state signals includes a state signal B1, a state signal B2, a state signal C1 and a state signal C2. Referring to FIG. 6, a detailed block diagram of the control circuit 31 of FIG. 4 is shown. Furthermore, the control circuit 31 includes comparators 31a, 31b and 31c and a logic unit 31d.

The comparator 31a compares the magnitude of the blanking voltage level L_blanking with that of the previous blanking voltage level L_blanking_d1, and respectively provides an enabled control signal C10 and an enabled control signal C11 when the blanking voltage level L_blanking is larger than the previous blanking voltage level L_blanking_d1 and the previous blanking voltage level_blanking_d1 is larger than the blanking voltage level L_blanking. For example, the comparator 31a can be realized by comparators 401 and 403.

The comparator 31b compares the magnitude of the sync height signal SH with that of the previous sync height signal SH_d1, and respectively provides enabled control signals C13 and C15 when the sync height signal SH is larger than the previous sync height signal SH_d1 multiplied by the weight parameter R3 and the sync height signal SH is larger than the previous sync height signal SH_d1 multiplied by the weight parameter R4. For example, the comparator 31b can be realized by multipliers 406 and 409 and comparators 414 and 432.

The comparator 31c compares the magnitude of the sync height signal SH with that of the previous sync height signal SH_d1, and respectively provides enabled control signals C12 and C14 when the previous sync height signal SH_d1 is larger than the sync height signal SH multiplied by the weight parameter R3 and the previous sync height signal SH_d1 is larger than the sync height signal SH multiplied by the weight parameter R4. For example, comparator 31c can be realized by multipliers 423 and 426 and comparators 411 and 429.

The logic unit 31d generates the group of state signals according to the control signal C12-C15 and the co-channel interference control signal S2. Furthermore, the control circuit 31d enables the state signal B1 of the group of state signals when the co-channel interference control signal S2 is disenabled, the control signal C10 is enabled (that is, the previous blanking voltage level L_blanking_d1 is higher than the blanking voltage level L_blanking) and the control signal C12 is also enabled (that is, the previous sync height signal SH_d is higher than the sync height signal SH multiplied by the weight parameter R3).

The control circuit 31d enables the state signal B2 of the group of state signals when the co-channel interference control signal S2 is disenabled, the control signal C11 is enabled (that is, the blanking voltage level L_blanking is higher than the previous blanking voltage level L_blanking_d1), the control signal C13 is also enabled (that is, the sync height signal SH is higher than the previous sync height signal SH_d multiplied by the weight parameter R3).

The control circuit 31d enables the state signal C1 of the group of state signals when the co-channel interference control signal S2 is disenabled, the control signal C10 is enabled (that is, the previous blanking voltage level L_blanking_d1 is higher than the blanking voltage level L_blanking) and the control signal C14 is also enabled (that is, the previous sync height signal SH_d is higher than the sync height signal SH multiplied by the weight parameter R4).

The control circuit 31d enables the state signal C2 of the group of state signals when the co-channel interference control signal S2 is disenabled, the control signal C11 is enabled (that is, the blanking voltage level L_blanking is higher than the previous blanking voltage level L_blanking_d1) and the control signal C15 is enabled (that is, the sync height signal SH is higher than the previous sync height signal SH_d multiplied by the weight parameter R4).

For example, the logic unit 31d can be realized by AND gates 440, 441, 442 and 443 and an NOT gate 420.

In the present embodiment of the invention, the co-channel interference control signal S2 and the state signals B1, B2, C1 and C2 generated by the signal detector 33 and the control circuit 31 are provided to respective sub-circuits of the slicer level voltage calculator 3 for executing corresponding control operation.

Adaptive Control with Respect to the Rear-End Processor 42:

Again, referring to FIG. 4. In an example, the rear-end processor 42 further includes a logic unit 42d which generates a driving signal E4 to drive the temporarily store operation of the register 42c with reference to the state signals B2, C1 and C2. Furthermore, the logic unit 42d enables the driving signal E4 with reference to the row updating signal Slu when the state signals B2, C1 and C2 are all disenabled, and further disables the driving signal E4 when the state signals B2, C1 and C2 are partially or totally enabled. When the state indicated by any of the state signals B2, C1 and C2 occurs, the driving signal E4 is disenabled to disable the temporarily store operation of the register 42c to disable the update operation of the slicer level L_slicer. When none of the states indicated by the state signals B2, C1 and C2 occurs, the driving signal E4 is enabled when the row updating signal Slu is enabled to drive the register 42c to correspondingly update the slicer level L_slicer.

The logic unit 42d can be realized by such as an OR gate OR1, an NOT gate NOT1 and an AND gate AND1.

Adaptive Control with Respect to the Slicer Level Calculation Circuit 40:

Again, referring to FIG. 4. In an example, the slicer level calculation circuit 40 further includes a logic unit 40c, a register 40d and a multiplexer 40e. The register 40 samples the blanking voltage level L_blanking outputted from the blanking voltage sample circuit 38 to provide a previous blanking voltage level L_blanking_d1 in response to the driving signal E5.

The multiplexer 40e receives and selectively outputs one of the blanking voltage level L_blanking and the previous blanking voltage level L_blanking_d1 in response to the state signal B1. For example, when state signal B1 is enabled (such as corresponding to logic value 1), the multiplexer 40e outputs the previous blanking voltage level L_blanking_d1. When state signal B1 is disenabled (such as corresponding to logic value 0), the multiplexer 40e outputs the blanking voltage level L_blanking. When the state signal B1 is enabled (that is, the situation when the co-channel interference control signal S2 is enabled, the previous blanking voltage level L_blanking_d1 is higher than the blanking voltage level L_blanking and the previous sync height signal SH_d is higher than the sync height signal SH multiplied by the weight parameter R3), the current blanking voltage level L_blanking may become unreliable due to severe co-channel interference. Thus, the multiplexer 40e drives the adder 40a and the multiplier 40e with reference to the previous blanking voltage level L_blanking_d1 to execute the operation of computing the slicer level L_slicer to avoid the adder 40a and the multiplier 40b using the unreliable blanking voltage level L_blanking which may result in erroneous slicer level L_slicer.

The logic unit 40c enables the driving signal E5 with reference to the row updating signal Slu when the state signals B1 and B2 are both disenabled, and further disables the driving signal E5 when the state signals B1 and B2 are partially or totally enabled. When the state signal B1 is enabled (that is, the situation when the co-channel interference control signal S2 is enabled and the previous blanking voltage level L_blanking_d1 is higher than the blanking voltage level L_blanking and the previous sync height signal SH_d is higher than the sync height signal SH multiplied by the weight parameter R3) or when the state signal B2 is enabled (that is, the situation when the co-channel interference control signal S2 is enabled and the blanking voltage level L_blanking is higher than the previous blanking voltage level L_blanking_d and the sync height signal SH is higher than the previous sync height signal SH_d multiplied by the weight parameter R3), the current blanking voltage level L_blanking may become unreliable due to severe co-channel interference. Thus, the logic unit 40e correspondingly disables the driving signal E5 to disable the data update operation of the register 40d to avoid the register 40d sampling the unreliable blanking voltage level L_blanking.

For example, the logic unit 40c can be realized by an OR gate OR2, an NOT gate NOT2 and an AND gate AND2.

Adaptive Control with Respect to the Sync Height Signal Calculator 44:

Again, referring to FIG. 4. In an example, the sync height signal calculator 44 of the slicer level calculator 3 includes a register 44d, which samples the sync height signal SH generated by the adder 44a and the absolute value getter 44b to obtain a previous sync height signal SH_d. When the state signal B1 is enabled or the state signal B2 is enabled, the current blanking voltage level L_blanking and the sync height signal SH obtained through estimation may become unreliable due to severe co-channel interference. Thus, the sync height signal calculator 44 such as includes a logic unit 44c similar to the logic unit 40c for generating an disabled driving signal E5' when the state signal B1 or B2 is enabled to avoid the register 44d sampling the unreliable sync height signal SH.

Adaptive Control with Respect to the Sync-Tip Voltage Sample Circuit 36:

Again, referring to FIG. 4. In an example, the sync-tip voltage sample circuit 36 includes a minimum searching unit 36a, a register 36b and a logic unit 36c. The minimum searching unit 36a enables the middle signal E1 when the minimum of the moving average voltage level Lma over an operation period is obtained. The register 36b samples the moving average voltage level Lma to obtain the sync-tip voltage level L_synctip in response to the enabled driving signal E2.

The logic unit 36c enables the driving signal E2 according to the enabled middle signal E1 when the co-channel interference control signal S2 is disenabled or the sync gate signal Hsync_gate is enabled, and further disables the driving signal E2 when the co-channel interference control signal S2 is enabled and the sync gate signal Hsync_gate is disenabled. When the co-channel interference control signal S2 is disenabled, the logic unit 36c controls the driving signal E2 to have substantially the same signal wave pattern with that of the middle signal E1 to drive the register 36b to obtain the sync-tip voltage level L_synctip through sampling according to the moving average voltage level Lma. When the co-channel interference control signal S2 is enabled, the moving average voltage level Lma may become unreliable due to severe co-channel interference. Thus, the logic unit 36c disables the driving signal E2 when the sync gate signal Hsync_gate is disenabled, and further controls the driving signal E2 to have substantially the same signal wave pattern with that of the middle signal E1 only when the sync gate signal Hsync_gate is enabled. For example, the logic unit 36c can be realized by such s an NOT gate NOT3, an OR gate OR3 and an AND gate AND3.

The slicer level calculator disclosed in the above embodiments of the invention has a signal detector for adaptively changing the operation of computing the slicer level when the input video signal satisfies the criterion of low SNR or co-channel interference. In comparison to the conventional slicer level calculation circuit, the slicer level calculator of the invention is advantaged by being capable of effectively generating the slicer level with higher accuracy when the image signal has a low signal to noise ratio (SNR) or is under the influence of co-channel interference.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slicer level calculator used for obtaining a slicer level of an input video signal, wherein the slicer level calculator comprises:
   a first signal detector used for determining whether the input video signal satisfies a low signal to noise ratio (SNR) criterion and further enabling a low SNR control signal when the input video signal satisfies the low SNR criterion;
   a moving average calculator used for obtaining a moving average voltage level of the input video signal;
   a sync-tip voltage sample circuit used for obtaining a sync-tip time information and a sync-tip voltage level of the input video signal;
   a blanking voltage sample circuit used for obtaining a blanking time information and a blanking voltage level of the input video signal with reference to the sync-tip time information;
   a slicer level calculator used for obtaining a slicer level according to the sync-tip voltage level and the blanking voltage level; and
   a rear-end processor used for selectively executing low-pass filtering operation on the slicer level in response to the low SNR control signal.

2. The slicer level voltage calculator according to claim 1, further comprising:
   a second the signal detector used for determining whether the input video signal satisfies a co-channel interference criterion and further enabling a co-channel interference control signal when the input video signal satisfies the co-channel interference criterion.

3. The slicer level voltage calculator according to claim 2, wherein the sync-tip voltage sample circuit comprises:
   a minimum searching unit used for enabling a middle signal when the minimum of the moving average voltage level is obtained;
   a register for sampling the moving average voltage level to obtain the sync-tip voltage level in response to an enabled driving signal; and
   a logic unit used for enabling the driving signal according to the enabled middle signal when the co-channel interference control signal is disenabled or a sync gate signal is enabled, and disenabling the driving signal when the co-channel interference control signal is enabled and the sync gate signal is disenabled.

4. The slicer level voltage calculator according to claim 2, further comprising:
   a control circuit used for generating a group of state signals according to the numerical relationship among the co-channel interference control signal, the blanking voltage level, the previous blanking voltage level, a sync height signal and the previous sync height signal.

5. The slicer level voltage calculator according to claim 4, wherein:
   the control circuit enables a first state signal of the group of state signals when the co-channel interference control signal is disenabled, the blanking voltage level is higher than the previous blanking voltage level and the sync height signal is higher than the previous sync height signal;
   the control circuit enables a second state signal of the group of state signals when the co-channel interference control signal is disenabled, the previous blanking voltage level is higher than the blanking voltage level and the previous sync height signal is higher than the sync height signal;
   the control circuit enables a third state signal of the group of state signals when the co-channel interference control signal is disenabled, the blanking voltage level is higher than the previous blanking voltage level and the sync height signal is higher than the previous sync height signal.

6. The slicer level voltage calculator according to claim 5, wherein the rear-end processor comprises:
   a low-pass filter unit used for executing low-pass filtering operation on the slicer level to obtain the low-pass filtered slicer level;
   a multiplexer used for receiving and selectively outputting one of the slicer level and the low-pass filtered slicer level in response to the low SNR control signal;

a register used for storing one of the slicer level outputted from the multiplexer and the low-pass filtered slicer level in response to a driving signal; and a logic unit used for enabling the driving signal with reference to a row updating signal when the first, the second and the third state signal are all disenabled, and disabling the driving signal when the first the third state signal are partially or totally enabled.

7. The slicer level voltage calculator according to claim 4, wherein:

the control circuit enables a fourth state signal of the group of state signals when the co-channel interference control signal is disenabled, the previous blanking voltage level is higher than the blanking voltage level and the previous sync height signal is higher than the sync height signal; and the control circuit enables a first state signal of the group of state signals when the co-channel interference control signal is disenabled, the blanking voltage level is higher than the previous blanking voltage level and the sync height signal is higher than the previous sync height signal.

8. The slicer level voltage calculator according to claim 7, wherein the
slicer level calculator comprises:

a register used for sampling the blanking voltage level outputted from the blanking voltage sample circuit in response to a driving signal to provide a previous blanking voltage level;

a multiplexer used for selectively receiving and outputting one of the blanking voltage level and the previous blanking voltage level in response to the fourth state signal; and an operation unit used for obtaining the slicer level according to the sync-tip voltage level and one of the blanking voltage level provided by the multiplexer and the previous blanking voltage level.

9. The slicer level voltage calculator according to claim 8, wherein the slicer level calculator comprises:

a logic unit used for enabling the driving signal with reference to a row updating signal when the first and the fourth state signals are all disenabled, and disabling the driving signal when the first and the fourth state signals are partially or totally enabled.

10. The slicer level voltage calculator according to claim 7, further comprising:

a sync height signal calculator, comprising:

an operation unit used for executing subtraction operation on absolute values of the sync-tip voltage level and the blanking voltage level to obtain a sync height signal;

a register used for sampling the sync height signal outputted from the operation unit in response to a driving signal to provide the previous sync height signal; and a logic unit used for enabling the driving signal with reference to a row updating signal when the first and the fourth state signals are all disenabled, and disabling the driving signal when the first and the fourth state signals are partially or totally enabled.

11. The slicer level voltage calculator according to claim 2, wherein the second the signal detector comprises:

an operation unit used for obtaining a horizontal sync amplitude of the sync-tip voltage level;

a first comparator used for determining whether the horizontal sync amplitude is larger than a sync height signal: if so, the comparator provides a selection signal corresponding to a first level, otherwise, the comparator provides a selection signal corresponding to a second level;

a counting unit used for progressively increasing a determination parameter by 1 in response to the first level of the selection signal, and progressively decreasing the determination parameter by 1 in response to the second level of the selection signal; and a second comparator used for determining that the input video signal satisfies the co-channel interference criterion when the value of the determination parameter is larger than a threshold, and correspondingly triggering the co-channel interference control signal.

12. The slicer level voltage calculator according to claim 11, wherein the second the signal detector further comprises:

a timing control unit used for providing an update timing signal with reference to a row updating signal to control the second the signal detector to replace the horizontal sync amplitude and the determination parameter every other segment of an update period.

13. The slicer level voltage calculator according to claim 2, wherein the blanking voltage sample circuit comprises:

a down-counter used for delaying the enabling of a second driving signal by a delay time in response to the driving signal;

a register used for sampling the moving average voltage level to obtain the blanking voltage level in response to the enabled second driving signal.

14. The slicer level voltage calculator according to claim 1, wherein the first
signal detector comprises:

an operation unit used for obtaining a high-frequency component signal of the input video signal, and executing absolute values moving average computing and weighting operations to obtain a noise intensity signal;

a first comparator used for determining whether the noise intensity signal is larger than a sync height signal: if so, the comparator provides a selection signal corresponding to a first level, otherwise, the comparator provides a selection signal corresponding to a second level;

a counting unit used for progressively increasing a determination parameter by 1 in response to the first level of the selection signal, and progressively decreasing the determination parameter by 1 in response to the second level of the selection signal; and a second comparator used for determining that the input video signal satisfies the low SNR criterion when the value of the determination parameter is larger than a threshold, and correspondingly triggering the low SNR control signal.

* * * * *